(12) United States Patent
Rung

(10) Patent No.: US 9,055,363 B2
(45) Date of Patent: Jun. 9, 2015

(54) HEADSET SYSTEM COMPRISING A NOISE DOSIMETER

(75) Inventor: Martin Rung, Bronshoj (DK)

(73) Assignee: GN Netcom A/S (DK)

( * ) Notice: Subject to any disclaimer, the term of this patent is extended or adjusted under 35 U.S.C. 154(b) by 507 days.

(21) Appl. No.: 12/667,188

(22) PCT Filed: Jul. 9, 2008

(86) PCT No.: PCT/DK2008/000259
§ 371 (c)(1),
(2), (4) Date: Jun. 10, 2010

(87) PCT Pub. No.: WO2009/006897
PCT Pub. Date: Jan. 15, 2009

(65) Prior Publication Data
US 2010/0278350 A1    Nov. 4, 2010

(30) Foreign Application Priority Data
Jul. 9, 2007  (DK) .................................. 2007 01009

(51) Int. Cl.
*H04R 29/00* (2006.01)
*H04R 1/10* (2006.01)
*G01H 3/14* (2006.01)

(52) U.S. Cl.
CPC .. *H04R 1/10* (2013.01); *G01H 3/14* (2013.01); *H04R 1/1058* (2013.01); *H04R 29/00* (2013.01); *H04R 2201/107* (2013.01)

(58) Field of Classification Search
CPC ............. G01H 3/14; G01H 3/06; G01H 3/10; G01H 3/12; H04R 1/10; H04R 29/00; H04R 1/1058; H04R 2201/107; H04R 29/001; H04R 1/1083; H04R 2410/01; H04R 2410/05; H04R 2420/07
USPC .............. 381/56–59, 72, 74, 94.1–94.4, 71.1, 381/71.6, 60, 312, 315, 317; 73/647
See application file for complete search history.

(56) References Cited

U.S. PATENT DOCUMENTS 5,970,795 A * 10/1999 Seidmann et al. .............. 73/585
6,456,199 B1 * 9/2002 Michael ..................... 340/573.1
(Continued)

FOREIGN PATENT DOCUMENTS

| GB | 2349466 | 11/2000 |
| JP | 58 073828 | 5/1983 |
| WO | WO 02/17836 | 3/2002 |

OTHER PUBLICATIONS

International Search Report for PCT/DK2008/000259.

*Primary Examiner* — Lun-See Lao
(74) *Attorney, Agent, or Firm* — Altera Law Group, LLC

(57) ABSTRACT

A noise dosimeter (xOO) for monitoring the exposure to noise of a user wearing a headset is described. The noise dosimeter includes a housing to be worn external to the ear of the user, an earpiece (xO1) for placement in or near an ear canal of the user, a microphone transducer, and a signal transmission means (xO3) for transmission of a signal from the earpiece (xO1) to the housing. The earpiece (xO1) comprises sound collection means (xO4) for collecting sound emitted from a speaker of the headset, and the housing comprises signal processing circuitry for processing and accumulating signals from the microphone transducer in order to evaluate a user's exposure to noise when using the headset. The noise dosimeter can be integrated in a headset.

28 Claims, 4 Drawing Sheets

(56) References Cited

U.S. PATENT DOCUMENTS

| | | | |
|---|---|---|---|
| 6,507,650 B1 * | 1/2003 | Moquin | 379/387.01 |
| 6,661,901 B1 | 12/2003 | Svean et al. | |
| 7,773,759 B2 * | 8/2010 | Alves et al. | 381/71.1 |
| 7,978,861 B2 * | 7/2011 | Michael | 381/60 |
| 2003/0191609 A1 | 10/2003 | Bernardi et al. | |
| 2005/0254667 A1 | 11/2005 | Michael | |
| 2006/0140425 A1 | 6/2006 | Berg et al. | |
| 2007/0014423 A1 | 1/2007 | Darbut et al. | |
| 2007/0186656 A1 * | 8/2007 | Goldberg et al. | 73/647 |
| 2008/0146890 A1 * | 6/2008 | LeBoeuf et al. | 600/300 |

* cited by examiner

HEADSET SYSTEM COMPRISING A NOISE DOSIMETER

TECHNICAL FIELD

The invention relates to a headset system including a headset and a noise dosimeter for monitoring the exposure to noise of a user wearing the headset. Other aspects of the invention relates to such a noise dosimeter in itself as well as a kit of parts comprising such a noise dosimeter and a headset.

BACKGROUND

Noise dosimeters are commonly used for measuring the accumulative exposure to noise, for instance over an entire work shift, in order to see if the noise exposure of a worker is within the norms of the regional or national regulations on noise exposure.

Noise is composed of many different types of noise, such impulse noise being short noise bursts having a duration of less than 1 second and continuous noise having a duration of 1 second or more. These two types of noise can also be measured as a time-weighted average (TWA), which is the average of both impulse noise and continuous noise over a given time, for instance 8 hours.

The maximum noise levels allowed for impulse noise, continuous noise and TWA at a work place is a matter of national or regional regulations. In the US for instance, the maximum impulse noise is 140 dB sound pressure level, the maximum continuous noise is 115 dBA (measured on the slow average "A" scale) and the maximum eight-hour TWA is 90 dBA.

Noise exposure is either measured via a direct method or an indirect method. In the direct method a noise dosimeter is worn by the worker during the work shift and the noise levels are evaluated in the actual environment of the worker. However, there does not exist any effective direct method of measuring the noise exposure of a worker using a headset or earphones.

In the indirect method, the headset or earphones are placed on an artificial head that measures the sound pressure applied to its ear(s). The indirect method has a number of flaws, since it does not compensate for the fact that a worker might wear the headset slightly different during a work shift and does not compensate for the individual variations in the shape of the head or ears of the worker, which may significantly impact the level of the actual sound pressure applied to the ear.

Users of communication headsets, such as people working in a call centre, are exposed to a large quantity of sound during a work shift, since sound from the headset speaker is sent directly into the ear for many hours. Therefore, it is important to obtain accurate measurements of the sound exposure levels of users wearing a headset in order to evaluate the influence of wearing a headset for many hours.

DISCLOSURE OF THE INVENTION

Therefore, it is an object of the invention to provide a new noise dosimeter, which is suitable for measuring the exposure to noise or sound of a user wearing a headset, and which overcomes or ameliorates at least one of the disadvantages of the prior art or which provides a useful alternative.

According to a first aspect of the invention, this is obtained by a headset system including a headset comprising a headset speaker or headphone for transmitting sound to a user of the headset, and a microphone for receiving speech sound from the user of the headset, when the headset is worn by the user, wherein the headset system further includes a noise dosimeter for monitoring the exposure to noise of a user wearing the headset, wherein the noise dosimeter is coupled to or part of the headset and includes: a housing to be worn external to the ear of the user, an earpiece for placement in or near an ear canal of the user, a microphone transducer, and a signal transmission means for transmission of a signal from the earpiece to the housing, wherein the earpiece comprises sound collection means for collecting sound emitted from a speaker of the headset, and the housing comprises signal processing circuitry for processing and accumulating signals from the microphone transducer in order to evaluate a user's exposure to noise when using the headset.

It is clear that the housing of the noise dosimeter can be part of the headset itself, which thereby comprises the necessary electronics for evaluating the noise exposure. This also means that the noise dosimeter can be powered from the headset itself via an electric coupling. Alternatively, the noise dosimeter may be coupled to the headset. Optionally, the noise dosimeter may be detachably coupled to the headset.

The sound collection means can be adapted to pick up the total amount of sound exposed to the ear of a user wearing a headset, i.e. both the sound emitted directly from the headset as well as sound from the surroundings. Thus, the noise dosimeter can be used in a noisy environment as well as an environment, where the user is only exposed to the sound emitted from the headset speaker. Consequently, the noise dosimeter is adapted to measure the total exposure to sound of a user wearing a headset. Therefore, the term "noise" does not relate to noise as such but to the total exposure to sound.

Thereby, it is possible to place the earpiece in or near the ear canal and thus under the earphones of the headset in order to obtain an exact measurement of the user's real exposure to noise, whereas the housing comprising the signal processing circuitry can be arranged so that it does not influence the noise measurements. The processing circuitry may further be arranged to compensate or correct the measured sound pressure so that it is comparable to free field sound pressure measurements.

The term "earpiece" is here only meant to define the actual placement of the element containing the sound collection means. Therefore, the term "earpiece" is meant as a generic term covering also other terms, such as a shell or an earmould.

According to a second broader aspect, the invention provides a noise dosimeter only, i.e. a noise dosimeter comprising a housing to be worn external to the ear of the user, an earpiece for placement in or near an ear canal of the user, a microphone transducer, and a signal transmission means for transmission of a signal from the earpiece to the housing, wherein the earpiece comprises sound collection means for collecting sound emitted from a speaker of the headset, and the housing comprises signal processing circuitry for processing and accumulating signals from the microphone transducer in order to evaluate a user's exposure to noise when using the headset.

In the following, various advantageous embodiments are described. The embodiments are applicable both to the first and the second broader aspects of the invention of the invention.

According to a preferred embodiment, the earpiece is adapted for insertion in the ear canal of the user. This embodiment provides for very accurate measurements. Alternatively, the earpiece is formed as an earpiece for placement outside the ear canal, preferably with the sound collection means facing away from the ear canal. In general, it is preferred that the sound collection means face towards the headphones of the headset.

According to a preferred embodiment, the earpiece is acoustically open. Thereby, a user of the headset can wear the noise dosimeter without impairing the function of the headset and without the need to increase the volume of the headset speaker or headphone.

According to one embodiment of the noise dosimeter, the microphone transducer is arranged in the housing so as to provide means for measuring signals guided from the sound collection means to the housing via the signal transmission means. According to an alternative embodiment, the microphone transducer is arranged in the earpiece.

According to an advantageous embodiment, the earpiece is kept in position at the ear canal of the user by means of a flexible and acoustically open ring, when the noise dosimeter is worn by the user. This allows undisturbed listening and use of headsets, while wearing the dosimeter. This can for instance be achieved by the earpiece being configured to fit within the ear canal and allowing sounds to pass through the ear canal around the earpiece or through apertures in the earpiece.

According to one embodiment of the noise dosimeter, the signal transmission means comprises a first end connected to the earpiece and a second end connected to the housing. The signal transmission means can for instance be an electrical conductor for transmission of an audio signal through it. Alternatively, the signal transmission means can be a sound tube for transmission of an acoustic sound signal through it. These configurations provide embodiments, where only a small wire or tube is connected to the earpiece and extends beyond the headphone of the headset, thereby making it possible for the headphone to close tightly to the ear of the user.

According to one embodiment, the signal transmission means has a pre-formed shape including a first bend to extend from an outside of the ear into an ear canal of the user, when the noise dosimeter is worn by the user. Thereby, the wire or sound tube can extend for instance along the temple of the user, thus ensuring that the earphone closes tightly to the ear of the user.

According to another embodiment, the signal transmission means and the housing are formed so that at least a part of the housing is arranged behind the pinna of the user's ear, when the noise dosimeter is worn by the user. This provides for a behind-the-ear (BTE) solution, where the housing can be worn comfortably behind the ear. So-called "open" BTE earpieces are known for hearing aids and are generally preferred in order to affect the ear canal as little as possible by avoiding blockage of the ear canal, i.e. the occlusion effect.

According to yet another embodiment, the signal transmission means has a pre-formed shape including a second bend for placement over the top of the ear, when the noise dosimeter is worn by the user. This provides a simple embodiment, where the housing can be arranged behind the pinna of the user's ear, when the noise dosimeter is worn be the user.

According to one embodiment of the noise dosimeter, the signal transmission means is a wireless connection, such as a Bluetooth™ or a DECT connection. Thereby, the earpiece can be integrated as a small unit without a wire or a sound tube and provides for a solution, which is compatible with headsets comprising earplugs as well.

According to another embodiment, the housing further comprises a battery. Preferably, the housing further comprises a connector for uploading measured and logged data, i.e. data from the signal processing circuitry. The connector can be a wireless connection or a wire connection.

According to yet another embodiment, the noise dosimeter is connected to a central data collection unit, which is adapted for collecting data from one or more dosimeters and/or headsets. Thereby, it is possible to monitor a number of users simultaneously. If the signal transmission means is a wireless connection, such as a Bluetooth™ or DECT connection, a particularly simple way of collecting data is provided.

The earpiece can be made of various materials, such as a hypo-allergenic silicone material.

According to an advantageous embodiment of the noise dosimeter, the signal transmission means is detachably coupled to the housing. According to another advantageous embodiment, the signal transmission means is detachably coupled to the earpiece. The detachable couplings can be implemented in various ways, such as threading, snap fit coupling and so forth. This provides a solution, where both the signal transmission member and/or the earpiece can easily be exchanged, which makes it easier to repair damaged parts or to make pieces custom made for a particular user.

According to one embodiment, the dosimeter further comprises visual means for visually displaying the accumulated signals from the microphone transducer. The visual means can also be part of the headset to which the dosimeter is connected. The visual means can for instance display the accumulated signals, i.e. the accumulated noise, by means of colours, such that the user gets an indication that he/she should adjust the sound volume of the headset.

According to an alternative embodiment, the dosimeter further comprises audio means for sending an audio signal once the accumulated signals from the microphone transducer reaches a predetermined level. The audio signal can also be sent from the headset. Thereby, the user by simple means gets an indication that a certain accumulated noise level has been exceeded and that the user should adjust the sound volume of the headset.

According to one embodiment of the noise dosimeter, the housing comprises a first mechanical attachment means for detachably coupling to a headset. Thereby, the noise dosimeter can be worn securely together with the headset. According to another embodiment, the noise dosimeter can also be coupled electrically to the headset. Thereby, the headset can for instance be able to play a warning sound, if a noise exposure level detected by the noise dosimeter exceeds a predetermined level. The mechanical coupling and/or electrical coupling makes it possible to use the same noise dosimeter for a number of different headsets. This is especially applicable to work places, where several users are using headsets, such as in a call centre. Thereby, the same noise dosimeter may in turn be used by the different headset users in the call centre in order to measure the various user's exposure to noise.

According to one embodiment of the headset, the second end of the signal transmission means is detachably coupled to a housing of the headset. Thereby, the headset can be worn with the earpiece and signal transmission means of the noise dosimeter, when noise evaluation is needed, or as a conventional headset without these components, when no noise evaluation is needed.

According to another embodiment of the headset, the headset is adapted to control the signal output level from the headset speaker based on noise measurements from the noise dosimeter. Thereby, the headset can be adapted to actively reduce the sound volume of the headset if for instance the accumulated noise during a work shift has exceeded a predetermined level.

According to a third aspect, the invention provides a kit of parts comprising a headset and a noise dosimeter having one of the previously mentioned configurations.

According to one embodiment, the noise dosimeter comprises a first mechanical attachment means and the headset comprises a second mechanical attachment means for detachably coupling to the first attachment means of the noise dosimeter.

BRIEF DESCRIPTION OF THE DRAWINGS

The invention is explained in detail below with reference to embodiments shown in the drawings, in which.

DETAILED DESCRIPTION OF THE INVENTION

Figure 1:
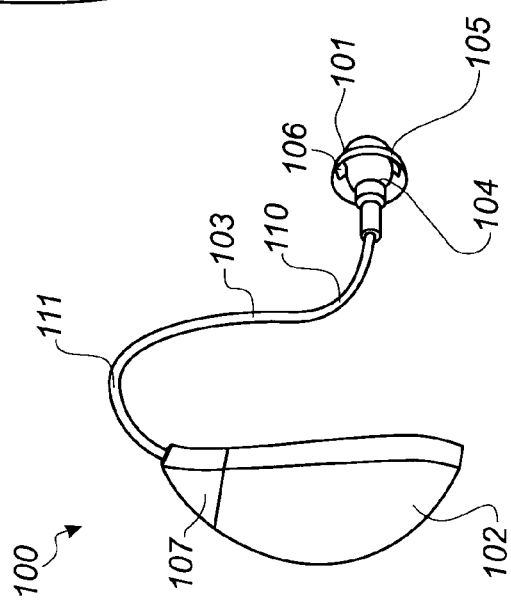
FIG. 1 is a schematic view of a noise dosimeter according to the invention, seen in perspective, FIG. 2 a partial cross-section of an ear together with the noise dosimeter of FIG. 1, FIG. 3 a partial cross-section of an ear with a noise dosimeter with a wireless transmitter inserted in the ear canal, FIG. 4 a schematic view of an acoustically open earpiece, FIG. 5 a central data collection unit for collecting data from a plurality of noise dosimeters, FIG. 6 a headset according to the invention with a noise dosimeter according to the invention coupled to the headset, FIG. 7 a headset according to the invention with an integrated noise dosimeter, FIG. 8 a first alternative headset configuration, and FIG. 9 a second alternative headset configuration.

FIG. 1 shows a first embodiment of a noise dosimeter 100 according to the invention. The noise dosimeter comprises an earpiece 101 and a housing 102. The earpiece comprises sound collection means 104, such as a microphone transducer, and the earpiece 101 is in this configuration shaped as an acoustically open ring, which comprises a flexible ring 105 for fitting inside an ear canal of a user and having a number of apertures 106, so that sound can pass through or around the earpiece, thereby affecting the ear canal as little as possible by avoiding blockage of the ear canal.

The housing 102 comprises signal processing circuitry for processing and accumulating signals picked up from the sound collection means 104 as well as a battery for powering the signal processing circuitry. A signal transmission means 103, here in form of a sound tube or a wire, transmits a signal from the earpiece 101 to the housing 102. The sound tube or wire is connected to the earpiece 101 and is detachably coupled to the housing 102 via a mechanical coupling means 107. The earpiece 101 can also be detachably coupled to the sound tube or wire. This provides for a flexible solution, where the individual parts can be exchanged in order to customise the noise dosimeter to the individual user for comfortable use. If the signal transmission means 103 is a sound tube, the microphone transducer can be arranged in the housing 102 instead of in the earpiece 101.

The sound tube or wire can be configured so that it comprises a first bend 110 and a second bend 111. This provides a simple solution for inserting the earpiece 101 of the noise dosimeter 100 in an ear canal 161 of the user and where the housing 102 can be worn behind the pinna of an ear 160. The first bend 110 ensures that a part of the sound tube or wire 103 extends along the temple of the user, whereas the second bend ensures that the housing 102 can be worn comfortably behind the pinna of the ear 160. This configuration is similar to the behind-the-ear (BTE) principle known from hearing aids.

The BTE configuration of the noise dosimeter provides for a solution, where the noise dosimeter can be used together with a headset without impairing the function of the headset and without the need to increase the volume of the headset speaker. Additionally, the noise dosimeter is comfortable to wear, which is an important feature, as the noise exposure is usually measured over an entire workshift, e.g. eight hours. Thus, the noise dosimeter is particularly suitable for measuring the noise exposure of users or workers using headsets or earphones.

Figure 3:
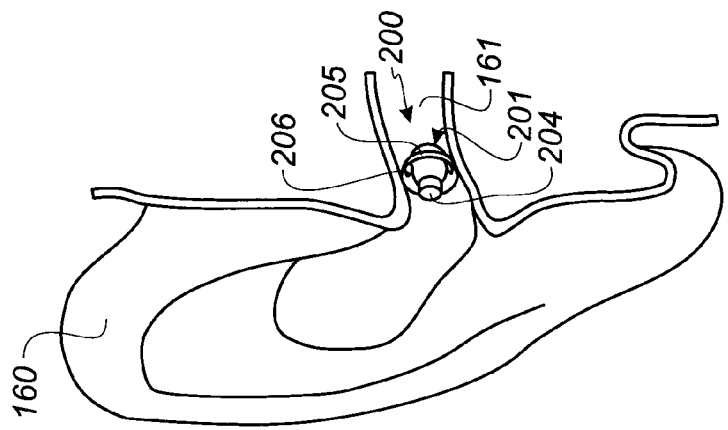
Figure 2:
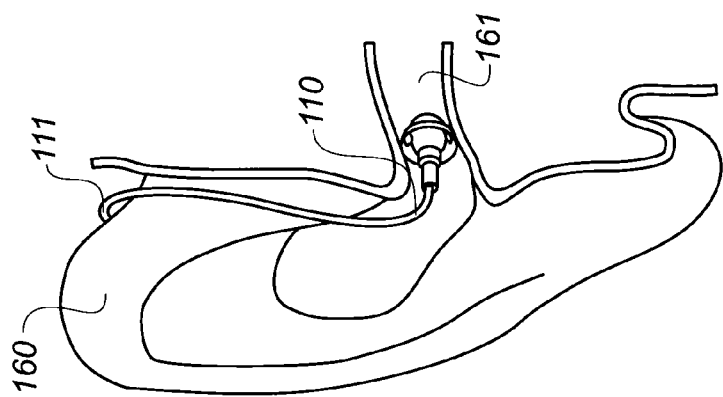

FIG. 3 shows a second embodiment of a noise dosimeter 200 according to the invention. In this configuration the noise dosimeter 200 comprises an acoustically open earpiece 201 having a flexible ring 205 for fitting inside the ear canal 161 of the user and a number of apertures 206. The earpiece comprises a microphone transducer and wireless signal transmission means. The earpiece 201 comprises a sound collection means 204, for instance in form of a diaphragm, which can be part of the microphone transducer. The housing comprising the signal processing circuitry comprises an antenna for receiving the wireless signal transmission. The housing can be worn anywhere, for instance on the shirt of the user or by attaching the housing to the headset. Alternatively, the housing comprising the signal processing circuitry can be part of the headset itself.

Figure 4:
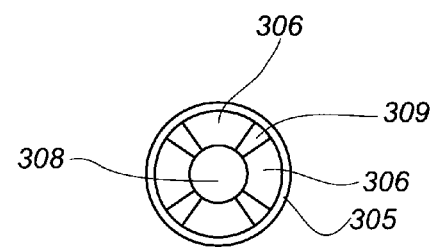

FIG. 4 shows an example of how to implement an acoustically open earpiece. The earpiece is made of a flexible material and comprises a ring 305, which due to the flexible material will fit comfortably inside the ear canal of a user. The earpiece comprises a sound collection means in form of a diaphragm microphone 308. The diaphragm microphone 308 is connected to the flexible ring 305 via a number of spokes 309. The spokes are separated by a number of apertures 306, through which the sound can pass unobstructed.

Figure 5:
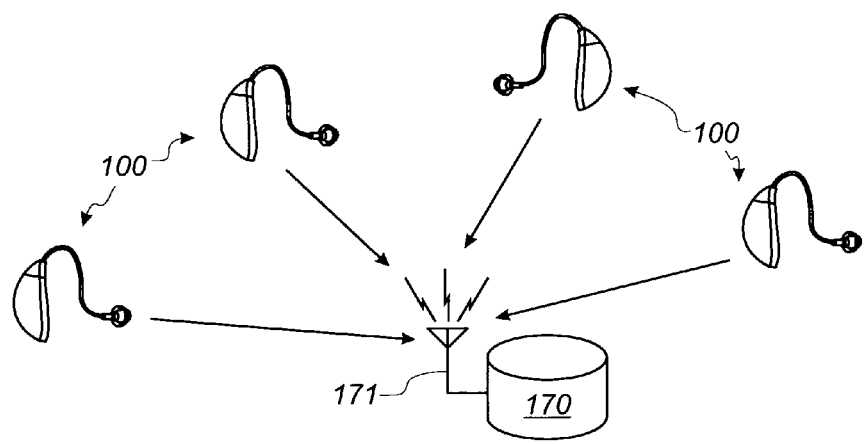

If the earpiece or the noise dosimeter comprises a wireless transmitter, the noise exposure measurements can be sent wireless to a central data collection unit 170 having an antenna 171 for receiving the noise exposure measurements from the individual earpieces or noise dosimeters. This provides for a solution, where it is possible to implement the signal processing circuitry in a central unit, which can be used to evaluate the noise exposure of a plurality of users. This situation is illustrated in FIG. 5.

Figure 6:
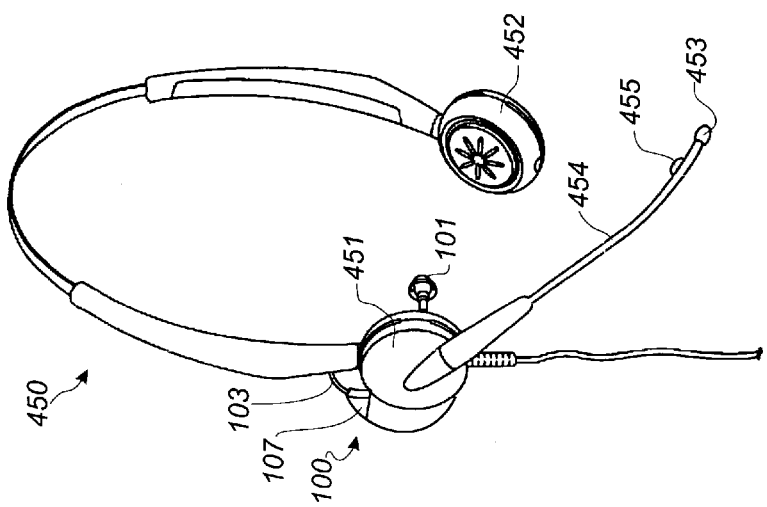

FIG. 6 shows a headset 450, to which a noise dosimeter 100 as shown in FIG. 1 is mechanically coupled. The headset 450 and noise dosimeter 100 are preferably also electrically coupled in order for the headset 450 to be able to play a warning sound or display visually if a noise exposure level (either peak or accumulated) detected by the noise dosimeter 100 exceeds a predetermined level. The headset 450 comprises a first headset speaker 451 and a second headset speaker 452 and a microphone 453 for picking up speech sound of a user wearing the headset 450. The microphone 453 is arranged on a microphone boom 454. The microphone boom 454 may also comprise a visual display means 455, such as a light emitting diode, for visually warning the user if a predetermined noise exposure level has been exceeded.

Figure 7:
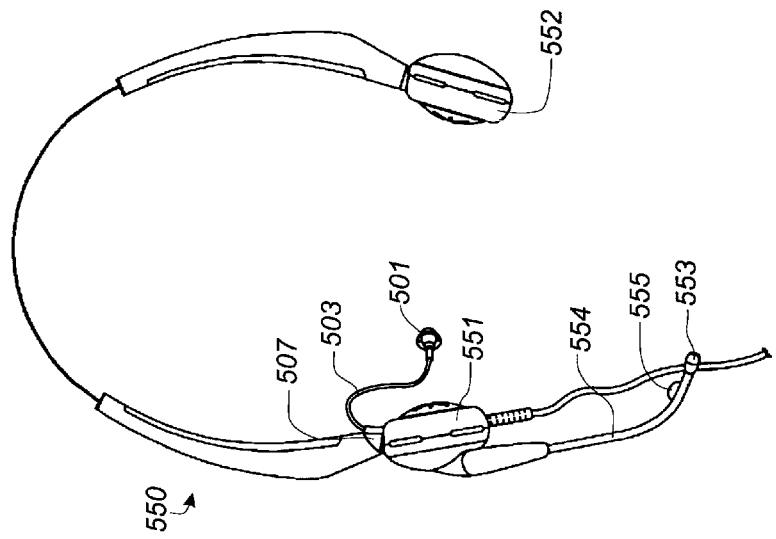

FIG. 7 shows an alternative embodiment of a headset 550 according to the invention. In this embodiment, the noise dosimeter is integrated in the headset 550. The headset 550 comprises a first headset speaker 551 and a second headset speaker 552 and a microphone 553 for picking up speech sound of a user wearing the headset 550. The microphone 553 is arranged on a microphone boom 554. The signal processing circuitry is integrated in the same housing as the first headset speaker 551. An earpiece 501 comprising sound collection means is connected to the housing via a signal transmission means 503 in form of a sound tube or a wire and a mechanical attachment means 507. If the signal transmission means 503 is a sound tube, the sound tube is preferably acoustically coupled to a microphone transducer in the housing. If the signal transmission means 503 is a wire, it is preferably electrically coupled to the housing. The microphone boom may also comprise a visual display means 555, such as a light emitting diode, for visually warning the user if a predetermined noise exposure level has been exceeded.

Figure 8:
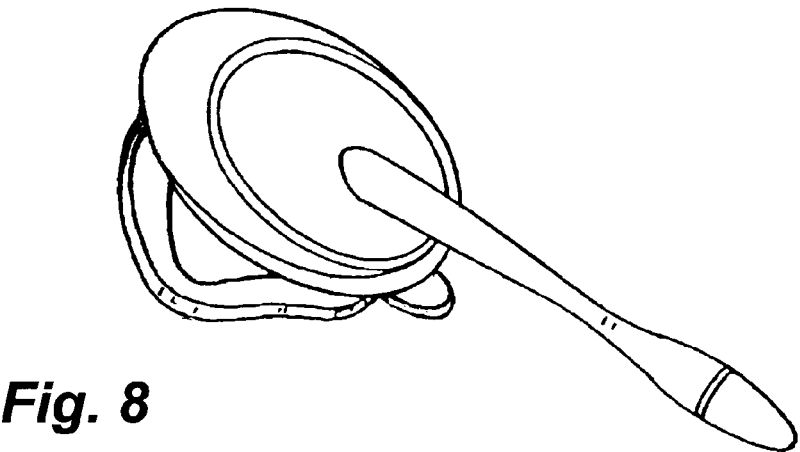
Figure 9:
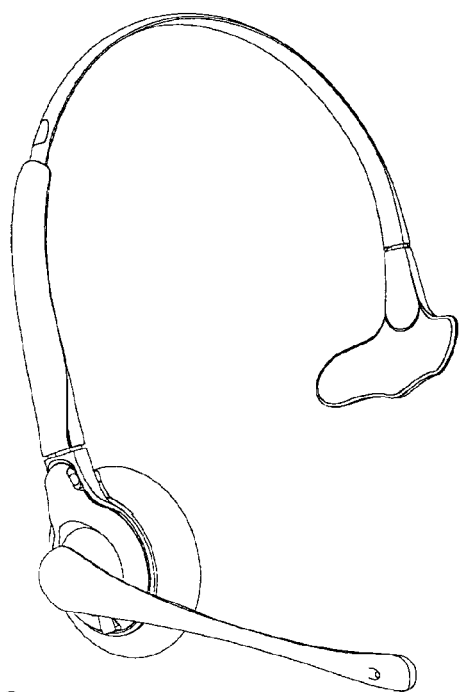

The examples have been described according to advantageous embodiments. However, the invention is not limited to these embodiments. The noise dosimeter can for instance be used with or be integrated in any type of headset, such as a headset as shown in FIG. 9 being similar to the ones shown in FIGS. 6 and 7 but having only one speaker, or a headset as shown in FIG. 8 with only one speaker and a hook for mounting on the ear of the user.

LIST OF REFERENCE NUMERALS

In the numerals, x refers to a particular embodiment. Thus, for instance 201 refers to the earpiece of the second embodiment.

x00 noise dosimeter
x01 earpiece
x02 housing
x03 sound transmission means
x04 sound collection means
x05 earpiece ring
x06 apertures
x07 mechanical attachment means
x08 diaphragm
x09 spoke
x10 first bend
x11 second bend
x50 headset
x51 first headset speaker
x52 second headset speaker
x53 headset microphone
x54 microphone boom
x55 visual display means
160 ear
161 ear canal
170 central data collection unit
171 antenna

The invention claimed is:

1. A headset system for measuring the summation of sound in a user's ear during use of a headset, comprising: a headset having a housing including a speaker for transmitting sound from a remote communications source into a user's ear and sensor for measuring composite sounds reaching a user's ear canal,
   a microphone for receiving speech sound from the user of the headset, when the headset is worn by the user, wherein the sensor further includes a noise dosimeter and a sound signal input conductor from the dosimeter for simultaneously monitoring the composite exposure to noise of a user wearing the headset and all other sound sources entering the users ear canal, wherein the noise dosimeter is coupled to or an integral part of the headset and includes:
   a housing removable from said speaker to be worn external to the ear of the user,
   an earpiece insertable into the user's ear canal and including a ring sized to receive the noise dosimeter input conductor suspended within the ring for insertion directly in an ear canal of the user and said earpiece being generally porous to sound passing therethrough and including at least one passageway therethrough to permit the passage of sound through the ear canal,
   a microphone connected to said earpiece and suspended in said ring and connected to the dosimeter for simultaneously collecting a composite of ambient sounds and sounds coming from said speaker which reaches the ear canal, and
   a signal transmitter for transmission of a signal from the earpiece to the housing and wherein
   the earpiece comprises sound collector for collecting all sound entering the user's ear canal, and
   wherein the noise dosimeter comprises signal processing circuitry for processing and accumulating signals from the microphone transducer in order to evaluate a user's exposure to noise when using the headset.

2. A headset system according to claim 1, wherein the noise dosimeter integrated into the headset housing and is detachably coupled to the headset.

3. A headset system according to claim 1, wherein the earpiece includes at least one suspension spoke extending from said ring toward the center thereof, and wherein said microphone is suspended within said ring by said spokes.

4. A headset system according to claim 1, wherein the earpiece includes suspension spokes extending from said ring toward the center thereof thereby creating voids between said spokes, thereby allowing sound to enter the ear canal.

5. A headset system according to claim 1, wherein the microphone transducer is suspended in the users's ear canal without substantially blocking the passage of sounds into the canal for measuring signals guided from the sound collector to the housing of the noise dosimeter via the signal transmitter.

6. A headset system according to claim 1, wherein the microphone transducer is arranged in the earpiece.

7. A headset system according to claim 1, wherein the earpiece is kept in position at the ear canal of the user by a flexible and acoustically open ring, when the noise dosimeter is worn by the user.

8. A headset system according to claim 1, wherein the earpiece is configured to fit within the ear canal and allows sounds to pass through the ear canal around the earpiece or through apertures in the earpiece.

9. A headset system according to claim 1 wherein the ear piece is configured to carry the sound input conductor into the ear canal and includes a peripheral ring sized to engage the ear canal, said conductor being suspended inside said ring with bridge members connecting the ring to the conductor with passages between the bridge members to allow passage of sounds into the ear canal.

10. A headset system according to claim 1, wherein the signal transmitter is wirelesses connected to a central collection unit configured to receive signals from a plurality of headsets with transmitters.

11. A headset system according to claim 10, wherein the earpiece includes a microphone transducer oriented to face outwardly from inside the user's ear canal.

12. A headset system according to claim 11, wherein said transducer is suspended within the space defined by said ring, and wherein sound passages are defined between said ring and speaker to allow transmission of sound into the ear canal.

13. A headset system according to claim 1, wherein the signal transmitter has a pre-formed shape including a first bend to extend from an outside of the ear into an ear canal of the user, when the noise dosimeter is worn by the user.

14. A headset system according to claim 1, wherein the signal transmitter and the housing of the noise dosimeter are formed so that at least a part of the housing of the noise dosimeter is arranged behind the pinna of the user's ear, when the noise dosimeter is worn by the user.

15. A headset system according to claim 1, wherein the signal transmitter has a pre-formed shape including a second bend for placement over the top of the ear, when the noise dosimeter is worn by the user.

16. A headset system according to claim 1, wherein the housing of the noise dosimeter further comprises a connector for uploading measured and logged data.

17. A headset system according to claim 1, wherein the noise dosimeter is connected to a central data collection unit, which is adapted for collecting data from one or more dosimeters and/or headsets.

18. A headset system according to claim 1, wherein the signal transmitter is detachably coupled to the housing of the noise dosimeter.

19. A headset system according to claim 1, wherein the dosimeter further comprises a visual display for visually displaying the composite accumulated signals which include ambient sound and sound from the transducer summed together, from the microphone transducer.

20. A headset system according to claim 1, wherein the dosimeter further comprises audio sender capable of sending an audio signal once the accumulated signals from the microphone transducer reaches a predetermined level.

21. A headset system according to claim 1, wherein the housing of the noise dosimeter comprises a first mechanical attachment for detachably coupling to the headset.

22. A headset system according to claim 1, wherein the second end of the signal transmitter is detachably coupled to a housing of the headset.

23. A headset system according to claim 1, wherein the headset is adapted to control the signal output level from the headset speaker based on noise measurements from the noise dosimeter.

24. A headset and a noise dosimeter together for measuring the summation of sound in a user's ear during use of a headset comprising:
 a housing to be worn external to the ear of the user,
 an earpiece sized for insertion directly in an ear canal of the user and including at least one passageway therethrough to permit the passage of sound into the ear canal bypassing the earpiece,
 a microphone connected to said earpiece transducer for collecting all sound which reaches the ear canal,
 a microphone transducer, and
 a signal transmitter for transmission of a signal from the earpiece to the housing, and wherein
 the earpiece includes a sound collector configured to collect the total sound entering the ear canal from the headset and any other sources, said earpiece including a ring, and wherein said transducer is suspended within the space defined by said ring and including sound passageways in said defined spaced for simultaneously collecting a composite of ambient sounds and sounds coming from said sound transmitter which reaches the ear canal, and
 signal processing circuitry for processing and accumulating signals from the microphone transducer which are a sum of the sounds reaching the ear canal from whatever source and direction;
 wherein the noise dosimeter includes a sound signal input conductor within said ring and wherein the conductor is detachably coupled to the headset, so that the headset can function without said dosimeter after dosimeter measurement have been taken.

25. A headset system according to claim 24, wherein the earpiece includes a microphone transducer oriented to face away from the user's ear canal, so that incoming sound is more accurately detected.

26. A headset system according to claim 24, wherein the earpiece includes a sound tube insertable in the user's ear canal, said sound tube including a flexible ring having a plurality of spokes separated by a plurality of through which the sound from the headset can pass unobstructed.

27. A headset system according to claim 26, wherein the earpiece includes a microphone transducer oriented to face away from the user's ear canal, so that incoming sound is more accurately detected.

28. A headset system for monitoring the sum of the total exposure to sound entering the ear canal of a user wearing a headset which itself provides sound input and ambient sound, the system comprising:
 a. a headset having a headset speaker for transmitting sound communications to a user of the headset,
 b. a noise dosimeter for monitoring the user's total exposure to sound of a user wearing the headset, said dosimeter being coupled to the headset and including:
 an earpiece for placement in an ear canal of the user, said ear piece being sufficiently acoustically open to sound transmission to allow sound from the headset speaker to pass into the ear canal around the earpiece,
 wherein the earpiece comprises a sound collector for collecting sound emitted from a speaker of the headset said earpiece including a ring and wherein said sound collector includes an input sensor located within the space defined by the ring a suspended therein with sound transmission apertures not fully blocking passage through space defined by the ring, and
 wherein the noise dosimeter comprises signal processing circuitry for processing and accumulating signals from the sound collector in order to evaluate a user's total exposure to sound when using the headset, said total exposure including the sum of ambient sound and sound from the speaker.

* * * * *